Patented Feb. 25, 1936

2,031,594

UNITED STATES PATENT OFFICE 2,031,594

MANUFACTURE AND TREATMENT OF MATERIALS

Henry Dreyfus, London, England

No Drawing. Application October 31, 1932, Serial No. 640,529. In Great Britain November 5, 1931

6 Claims. (Cl. 106—40)

This invention relates to the production of solutions, plastic masses and other compositions, whether liquid, semi-solid or solid, and of filaments, films, sheets, shaped articles and other products therefrom, and also to the treatment of such products, and it relates particularly to the use in such processes of cyclic ethers obtainable by the condensation of glycerine or other tri-hydric alcohols.

The cyclic ether compounds employed according to the present invention may be obtained in any suitable manner, e. g. by treating the tri-hydric alcohol with a dehydrating agent, e. g. sulphuric acid, phosphoric acid, zinc chloride, benzene sulphonic acid, calcium chloride and other agents having a relatively high avidity for water. The above agents may be used to effect the condensation of the glycerine or other tri-hydric alcohol at relatively low temperatures, but less powerful dehydrating agents may be used at high temperatures.

I find that it is comparatively easy to ascertain the specific conditions for dehydration in order to produce the cyclic ethers in the case of any particular dehydrating agent, since the cyclic ethers themselves are relatively volatile and may be distilled off from the reaction mixture in presence or absence of water, while if the dehydration or condensation is conducted under such conditions as to produce only non-cyclic compounds, for example the di- and poly-glycerines, such distillation is not possible, since the compounds formed are practically non-volatile. Further it is possible to conduct the dehydration in stages, and it is noticeable that two distinct types of product may be produced, the one being less volatile than the other. It appears that the condensation takes place first to produce a hydroxy substituted cyclic ether, since the hydroxy groups may be esterified or etherified, and then if further proceeded with a completely cyclic ether containing no hydroxy groups may be produced. Generally the conditions may be adjusted quite easily for the preparation of these two types of products, since the hydroxy containing cyclic ether is less volatile than the completely condensed product, and therefore if the conditions are adjusted so that the hydroxy body is not removed from the sphere of reaction then the condensation can be carried further to the completely condensed product. In a similar way other tri-hydroxy alcohols may be treated.

The distillate obtained as described above or, where distillation is not effected, the reaction mixture, from which the catalyst has preferably been removed, may be purified in any suitable manner. A distillation or further distillation is often of advantage. Aldehydic or ketonic by-products may be suitably removed, as for example by means of bisulphites, and water may be removed by means of dehydrating agents and/or with the aid of substances, such as benzene, toluene and methylene chloride, capable of forming azeotropic mixtures with the water.

Products having similar properties may be produced from mixtures of glycerine or other tri-hydric alcohol with glycols and/or aldehydes or ketones, for instance ethylene glycol, propylene glycol, 1.2 or 2.3 butylene glycol, isobutylene glycol, formaldehyde, acetaldehyde, acrolein, acetone, cyclohexanone and benzaldehyde, and the invention also includes the use of such products.

I find that both types of ether, hydroxy and non-hydroxy, and also the etherified and esterified hydroxy cyclic ethers, for instance the methylated, ethylated, acetylated, lactylated and formylated derivatives, form a valuable series of solvents and softening or plasticizing agents for a large variety of organic products and notably for dyestuffs, resins, both natural and artificial, and cellulose esters and ethers, and the present invention includes all such applications. Of the resins which may be dissolved in or softened or plasticized by the said compounds, I may mention shellac, dammar, the phenol aldehyde fusible soluble synthetic resins, both in the Novolak and Resol stage, and similar resins from other starting materials, for instance from diphenylol-propane and formaldehyde and other aldehydes, from urea or thiourea and formaldehyde, from glycerine or other polyhydric alcohol and phthalic acid or other poly-carboxylic acid, and also the polymerized vinyl resins, for example polymerized vinyl acetate.

However, the most important application of the substances of the present invention is the utilization of their solvent properties for cellulose acetate, cellulose nitrate and other esters or ethers of cellulose. The substances used according to the present invention, and particularly those containing no hydroxy groups or in which the hydroxy groups have been esterified or etherified, are especially important in dissolving or softening cellulose derivatives of high ester or ether content, particularly those containing more than two substituent groups per $C_6H_{10}O_5$ molecule. Thus the above substances have a very good solvent or softening action not only for the commercial acetone-soluble cellulose acetate having an acetyl content of about 52–54%, calculated as acetic acid, but also for the cellulose acetates having a high acetyl content, e. g. 56–58% or 60%, and even for the tri-acetate having an acetyl content of 62.5%. These discoveries are of particular value since the available solvents for the acetone-soluble cellulose acetates are limited, and those available for the tri-acetate are very few in number and their use is in general prohibitive since they are toxic chlorine derivatives and are expensive.

The cyclic ethers may be employed in the manufacture of spinning solutions for producing artificial filaments, ribbons, films, foils, sheets and the like by dry or wet processes, for the manufacture of dopes, varnishes and lacquers, and also in the manufacture of plastics and moulding powders and moulded articles. They may further be employed in wet spinning processes, in the actual coagulating baths, as described in U. S. Patent No. 1,467,493 and U. S. applications Nos. 402,785 filed 26th October, 1929, and 418,414 filed 3rd January, 1930, in subsequent treatment baths and/or in the spinning solution as in U. S. application S. No. 402,785 filed 26th October, 1929.

In the manufacture of dopes, varnishes and the like the cyclic ethers are particularly valuable when used in an anhydrous state or in the presence of only small quantities of water. Thus they are preferably employed with other anhydrous or substantially anhydrous solvents and/or diluents, since the presence of water in a lacquer or varnish leads to disadvantages in the films produced when dried under ordinary conditions.

In all the above applications the solvents of the present invention may be employed with or without other solvents and/or diluents, for example acetone, methyl acetone, dioxane, dimethylene dioxide, cyclic oxo-ketones, e. g. tetrahydropyrone, methyl acetate, ethyl acetate, butyl acetate, ethers of olefine and polyolefine glycols, methylene chloride, ethylene chloride, dichlorethylene, trichlorethylene, chloroform, alcohols, hydrocarbons and ethers, e. g. isopropyl ether. In the manufacture of dopes, lacquers and the like it is convenient to employ the new cyclic ethers and their etherified or esterified derivatives with lower boiling solvents, such as those instanced above. Other medium or high boiling solvents or plasticizers may also be incorporated, for example triacetin, diethyl phthalate, dibutyl phthalate, sulphonamides, for example, alkylated xylene sulphonamides, sulphonanilides, tartrates, for instance dibutyl tartrate or diphenylol propane or other phenolic plasticizers. Hydroxy compounds, e. g. glycol and glycerine or other diluents for example toluene, xylene or other relatively cheap hydrocarbons or non-solvents for the cellulose derivatives may be incorporated in the dopes, varnishes, lacquers, spinning solutions or the like within the range of tolerance of such solutions. The above cellulose derivative compositions may contain any other desired constituents, for instance dyestuffs pigments, fillers or resins, for example the natural and synthetic resins already referred to. The compositions may also, if desired, contain substances adapted to reduce their flammability, as for example halogenated and particularly brominated organic compounds, for example tribromacetanilide and other brominated acidylated aromatic amines. The substances for reducing flammability may themselves be plasticizers, as in the case of the tribromacetanilides, in which case they may be used, if desired, alone. The particular condensation products used according to the present invention may themselves contain halogen atoms, and may thus of themselves exert a fire-retardant action.

As mentioned above, in the case of the production of artificial filaments, ribbons, films and similar materials from spinning solutions containing the condensation products employed according to the present invention, such products will not in general constitute the sole solvent present, since they are mostly compounds of low volatility. Preferably, in the case of dry spinning processes, other volatile liquids are used in conjunction with the condensation products employed according to the present invention, as, for example, acetone or a mixture of acetone and alcohol or mixtures of methylene or ethylene chloride with ethyl or methyl alcohol, and it is preferable that such more volatile solvents should constitute the major portion of the total solvent. When the materials are produced by wet spinning processes, the low volatility of the condensation products is of less importance, so that they may constitute the sole solvent present in the spinning solution, but it is nevertheless preferable to employ them in conjunction with other more volatile solvents. In the case of wet spinning processes the condensation products may be employed in the spinning solution or in the coagulating or an after-treatment bath or in any two or more of these media, as described, for example, in U. S. Patent No. 1,467,493 and U. S. applications S. Nos. 402,785 filed 26th October, 1929 and 418,414 filed 3rd January, 1930.

The compounds employed according to the present invention are of considerable value in the production of plastic materials and of moulding powders on account of their relatively low volatility, and they may be incorporated in the materials by any suitable process. For instance the glycerine or other condensation product may be dissolved or dispersed in a suitable liquid, which may be either a solvent or non-solvent for the cellulose derivative or other base of the plastic material or moulding powder, and the solution or dispersion may then be sprayed upon or otherwise incorporated with the base and the mass worked on malaxating rollers in the customary manner. Among suitable liquids for incorporating the compounds used according to the present invention may be mentioned water, alcohol and mixtures of these two liquids, and benzene or other aromatic hydrocarbons.

In addition to being of value in the working up of cellulose esters and ethers into any desired products as described above, the solvents, softening agents and plasticizers of the present invention are also highly valuable for the treatment of already formed articles made of or containing cellulose derivatives, for example filaments, yarns, threads, ribbons, films, fabrics and the like. Such treatments may have various objects. For example the tendency of woven fabrics to slip and of warp or circular knitted fabrics to split or ladder may be diminished or eliminated by treatment with the solvents of the present invention in the manner described in U. S. application S. No. 152,516 filed 3rd December, 1926. The new agents may be used to improve the pliability of filaments, threads and the like and in particular to improve the knotting properties of comparatively thick filaments or artificial horsehair, and to improve the extension of filaments, threads, yarns and the like, by effecting treatment with the solvents without stretching and preferably with shrinking. This latter application is particularly important in relation to the treatment of filaments or the like of low extension produced by wet spinning processes, and filaments or the like of low extension produced by the stretching of dry spun products. Such shrinking processes are described broadly in U. S. application S. No. 611,240 filed 13th May, 1932. The cyclic compounds may also be used in the production of shrinkage effects, as described e. g. in U. S. application S. No. 607,667 filed 26th April, 1932.

Further the ethers and their derivatives may be employed in the manner described in U. S. Patent No. 1,709,470 and U. S. application S. No. 378,684 filed 16th July, 1929, for the purpose of improving the tenacity of the filaments or other products by softening the products with the solvents or softening agents of the present invention and simultaneously or subsequently applying a stretching treatment. To effect the softening the cyclic ethers of the invention may be incorporated in the spinning solutions used for the manufacture of the materials and/or may be applied to the already formed goods. Thus a suitable proportion may be incorporated in the spinning solution and the whole spun by dry spinning processes. The stretching treatment may be applied in one operation and preferably gradually or may be applied in a number of stages, as described in U. S. application S. No. 573,424 filed 6th November, 1931. Again, as is described in U. S. application S. No. 602,844 filed 2nd April, 1932, the filaments or other products may be stretched while in warp formation by applying a stretching force to the warp as a whole, and this method is particularly advantageous from the point of producing regularity of stretch and also for reasons of economy.

Further, for the treatment of filaments, yarns and the like sizes may be made up containing the new solvents or softening agents so as to effect a lubrication of the yarns, particularly for facilitating textile operations, such as winding, winding and twisting, beaming and the like. Such sizes may be made up with or without suitable thickening agents such as polymerized vinyl compounds, or oxidized linseed oil or other drying oils.

The solvents or softening agents are also of importance in processes involving the absorption of various liquid or solid materials by filaments, yarns, threads, ribbons, films, fabrics and the like containing cellulose esters or ethers. For example such products may be treated with the solvents during or before a treatment adapted to dye, print, load, mordant, or apply delustering compounds to the materials, the absorption of the dyes, loading agents, mordanting agents and delustering compounds being facilitated or rendered possible by the aid of the solvents. Thus a large number of solid agents have little or no affinity for cellulose acetate and by the use of the compounds employed according to the present invention such substances may be incorporated in the materials by dyeing, printing, stencilling, mechanical impregnation or other methods. Examples of such substances are certain basic dyestuffs having relatively little affinity, particularly in printing processes, acid wool and direct cotton dyestuffs, certain vat dyestuffs, white and coloured pigments, for example titanium dioxide, and certain discharges, for example, formaldehyde sulphoxylate discharges. Again, in printing and similar operations it is usual to fix the dyestuff or other agent in the material by means of a steaming or ageing treatment. If however the cyclic ethers are incorporated in the printing compositions or similar compositions, the materials may be simply dried under such conditions as to volatilize the cyclic ethers in order to effect fixation without the use of steaming or ageing. Preferably the more volatile cyclic ether bodies, as, for example, di-glycerine-tri-ether, are used for this purpose.

Again in the treatment of yarns, fabrics, etc., the solvents of the present invention may be utilized to relustre fabrics or other materials containing cellulose acetate or other organic esters or ethers which have been delustered by the action of moist steam or of hot aqueous media, and reference is made in this connection to U. S. Patent No. 1,808,098. The relustering may be effected uniformly over the whole of the material or merely locally so as to produce an effect fabric, for example, by printing on the cyclic ether with the aid of a suitable thickening agent and drying in order to relustre the material in the printed portions. Dyestuffs, pigments, discharges or other effect materials may be incorporated in the printing paste containing the cyclic ether compound.

In all the above applications of the solvents or softening agents of the present invention to already formed products made of or containing the cellulose acetate or other organic esters or ethers of cellulose, the agents may be employed as such, particularly with the higher boiling hydroxy bodies of their esters or ethers, or where their solvent power is too great they may be mixed with suitable diluents, for example hydrocarbon diluents of the aliphatic, aromatic or cycloaliphatic series, ethers, alcohols, water or the like. Furthermore the solvents may of course be mixed with other solvents.

The agents of the present invention are particularly important in relation to the manufacture of artificial silk, ribbons, films, dopes, lacquers, plastics, moulding powders and the like, and the treatment of filaments, fabrics and other formed products of cellulose acetate, but may also be applied to the manufacture and treatment of similar products of cellulose formate, cellulose propionate, cellulose butyrate, nitro acetate (of low nitrogen content) and other organic esters of cellulose, cellulose nitrate and also of methyl, ethyl or benzyl celluloses or other cellulose ethers, or mixed ethers or mixed ether-esters, for example ethyl cellulose acetate and oxy-ethyl-cellulose acetate.

The following examples are given in order to illustrate the invention but it is to be clearly understood that they do not limit it in any way.

*Example 1*

The following is an example of the production of a plastic mass containing cellulose acetate and a cyclic ether obtainable by the condensation of glycerine. 30 to 35 parts of the monomethyl-ether of di-glycerine-di-ether, or the monoacetate thereof, in 100 parts of a suitable liquid, for example benzene-alcohol, are sprayed on to or otherwise incorporated with about 100 parts of acetone-soluble cellulose acetate. The mass is worked up as usual on malaxating rollers, the alcohol being evaporated or allowed to evaporate during and/or after malaxation in order to obtain the plastic mass, which may then be moulded into sheets, rods, blocks or other articles. These may be seasoned as usual.

Example 2

The following composition may be used as a lacquer for coating articles of any kind.

| | Parts |
|---|---|
| Cellulose acetate | 50 |
| Polymerized vinyl acetate | 50 |
| Di-glycerine-tri-ether | 35 |
| Acetone | 500 |
| Alcohol | 250 |
| Benzene | 250 |

The diglycerine tri-ether employed in this example is the fraction boiling at 168 to 176° C. obtained in the presence of acid dehydrating agents.

Example 3

The following is an example of a lacquer composition containing nitrocellulose:—

| | Parts |
|---|---|
| Nitrocellulose | 100 |
| Diphenylol-propane-formaldehyde resin | 20 |
| The diacetate of di-glycerine-di-ether | 20 |
| Triphenyl phosphate | 20 |
| Acetone | 100 |
| Butyl acetate | 600 |
| Alcohol | 300 |

Example 4

The following is an example of a lacquer composition which may be used for producing flexible films or coatings:—

| | Parts |
|---|---|
| Cellulose acetate | 100 |
| Diphenylol-propane-formaldehyde resin | 30 |
| Dibutyl tartrate | 200 |
| Tricresyl phosphate | 15 |
| Acetone | 500 |
| Dioxane | 100 |
| Di-acetate of di-glycerine di-ether | 50 |

Example 5

The following is an example of the use of a solution containing the cyclic ethers of the present invention in the production of artificial filaments. A solution containing

| | Parts |
|---|---|
| Cellulose acetate | 100 |
| Acetone | 300 |
| Methyl-ether of the mono-acetate of di-glycerine di-ether | 30 to 40 | is spun through suitable orifices into an evaporative atmosphere at a temperature of 60 to 70° C. The filaments produced may be drawn out to fine denier and in order to assist in this they may before complete drying be carried round light rollers, glass rods or the like in order to provide a resistance beyond which a further stretch may be applied.

Example 6

A 23 to 25% solution of cellulose acetate in acetone containing 5% of water is extruded into a coagulating bath consisting of a 25-35% solution of the tri-ether of di-glycerine in alcohol, water or a mixture of alcohol and water and after emerging from the coagulating bath the filaments are taken through a guide to a rotating roller and drawn out at a speed of from 50 to 70 metres per minute. They are then washed, for example with a salt solution or with a dilute solution of the di-glycerine-tri-ether and finally dried. If desired the spinning solution used according to this example may contain from 2 to 4% of the cyclic ether body.

Example 7

Filaments or yarns of cellulose acetate in hank or other suitable form are soaked for from 2 to 5 minutes in an aqueous, alcoholic or aqueous-alcoholic bath containing 30 to 40% of the compound obtained by condensing glycerol with 1:2 propylene glycol. They are then stretched to the desired extent, for example by 100% or more of their original length, the operation being preferably carried out slowly. By providing a bath of suitable length and if desired, slightly increasing the concentration of the cyclic ether, the stretching operation may be applied to travelling filaments, as for example filaments in warp formation.

Example 8

The following is an example of a printing operation in which the cyclic ethers used according to the present invention are employed. A fabric consisting of cellulose acetate yarn, either delustred or of normal lustre, is printed with the following printing paste:—

| | Parts |
|---|---|
| Dyestuff or pigment | 2 to 7 |
| Diethylene glycol | 12 to 15 |
| Water | 30 |
| The methyl ether of the condensation product of glycol and glycerine | 40 to 100 |
| Gum arabic 1:1 | 80 to 120 |

The dyestuff may be a typical cellulose acetate dyestuff, for example a dyestuff of the amino-anthraquinone series or a nitro-di-arylamine, or it may be an acid wool or direct cotton dyestuff. Alternatively, if desired a pigment, for example titanium dioxide may be used. After printing, the fabric is dried at a temperature of 85 to 95° C. for sufficient time to cause the glycerine ether to evaporate and it is then washed with warm water at 50° C. in a solution containing 2½ grams of soap per litre and finally rinsed. When a delustred fabric is used and the printing paste includes a dyestuff the lustre upon the printed areas is restored.

What I claim and desire to secure by Letters Patent is:—

1. Compositions of matter containing an organic derivative of cellulose and a cyclic ether obtainable by the condensation of a trihydroxy alcohol with an aliphatic alcohol containing at least two but less than four hydroxy groups.

2. Liquid compositions of matter containing an organic derivative of cellulose and a cyclic ether obtainable by the condensation of a trihydroxy alcohol with an aliphatic alcohol containing at least two but less than four hydroxy groups.

3. Liquid compositions containing cellulose acetate and diglycerine triether.

4. Plastic compositions containing an organic derivative of cellulose and a cyclic ether obtainable by the condensation of a trihydroxy alcohol with an aliphatic alcohol containing at least two but less than four hydroxy groups.

5. Plastic compositions containing cellulose acetate and diglycerine triether.

6. Process for the manufacture of compositions of matter containing cellulose acetate, comprising dissolving or softening the cellulose acetate by means of media containing diglycerine triether.

HENRY DREYFUS.